(12) United States Patent
Mikajiri

(10) Patent No.: US 8,717,640 B2
(45) Date of Patent: May 6, 2014

(54) OPTICAL SCANNER AND IMAGE FORMING APPARATUS INCLUDING SAME

(71) Applicant: Susumu Mikajiri, Tokyo (JP)

(72) Inventor: Susumu Mikajiri, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/670,930

(22) Filed: Nov. 7, 2012

(65) Prior Publication Data

US 2013/0135696 A1    May 30, 2013

(30) Foreign Application Priority Data

Nov. 30, 2011 (JP) ................. 2011-261770
Jun. 15, 2012 (JP) ................. 2012-136029

(51) Int. Cl.

| | | |
|---|---|---|
| *H04N 1/04* | (2006.01) | |
| *H04N 1/21* | (2006.01) | |
| *H04N 1/46* | (2006.01) | |
| *H04N 1/29* | (2006.01) | |
| *G02B 26/08* | (2006.01) | |
| *H01J 5/16* | (2006.01) | |
| *B41J 15/14* | (2006.01) | |

(52) U.S. Cl.
USPC .......... 358/494; 358/296; 358/484; 358/474; 358/514; 358/300; 359/206.1; 359/200.1; 359/196.1; 359/216.1; 250/234; 347/242

(58) Field of Classification Search
USPC ............... 358/494, 296, 484, 474, 514, 300; 359/206.1, 196.1, 216.1; 250/234; 399/323; 347/242
See application file for complete search history.

(56) References Cited

U.S. PATENT DOCUMENTS

| | | | |
|---|---|---|---|
| 4,800,401 A * | 1/1989 | Sato et al. ...................... | 347/242 |
| 5,751,431 A * | 5/1998 | Taka et al. ..................... | 358/296 |
| 7,528,363 B2 * | 5/2009 | Fukase .......................... | 250/234 |
| 8,081,365 B2 * | 12/2011 | Kato et al. ................... | 359/216.1 |
| 2002/0021477 A1 * | 2/2002 | Fukita et al. .................. | 359/200 |
| 2003/0197902 A1 * | 10/2003 | Miura ............................ | 358/486 |
| 2007/0002415 A1 * | 1/2007 | Kato et al. ..................... | 359/196 |
| 2007/0279707 A1 * | 12/2007 | Yamaguchi ................... | 358/484 |
| 2008/0259424 A1 * | 10/2008 | Itami et al. .................... | 359/200 |
| 2009/0028603 A1 * | 1/2009 | Yoo ............................... | 399/151 |

(Continued)

FOREIGN PATENT DOCUMENTS

| | | |
|---|---|---|
| JP | 6-337342 | 12/1994 |
| JP | 10-020628 | 1/1998 |
| JP | 11-326808 | 11/1999 |
| JP | 2008-191555 | 8/2008 |

*Primary Examiner* — Charlotte M Baker
*Assistant Examiner* — Rury Grisham
(74) *Attorney, Agent, or Firm* — Harness, Dickey & Pierce, P.L.C.

(57) ABSTRACT

An optical scanner includes a light source for projecting a light beam, a deflector for deflecting the light beam, a reflective member for reflecting the light beam toward a target, a contact member, and a pressing member. The reflective member includes a reflective plane and a rear plane opposite the reflective plane. The contact member contacts one of the rear plane of the reflective member and a first lateral plane perpendicular to the reflective plane to position the reflective member in place. The pressing member presses the reflective member against the contact member and includes a first pressing portion to press the reflective plane of the reflective member and a second pressing portion to press a ridge of the reflective member at which the reflective plane and a second lateral plane opposite the first lateral plane and perpendicular to the reflective plane of the reflective member meet.

5 Claims, 6 Drawing Sheets

(56) References Cited

U.S. PATENT DOCUMENTS

2010/0060965 A1* 3/2010 Oda et al. ............... 359/216.1
2010/0247179 A1* 9/2010 Isahai et al. ............... 399/323
2012/0033281 A1* 2/2012 Kato et al. ............... 359/206.1

* cited by examiner

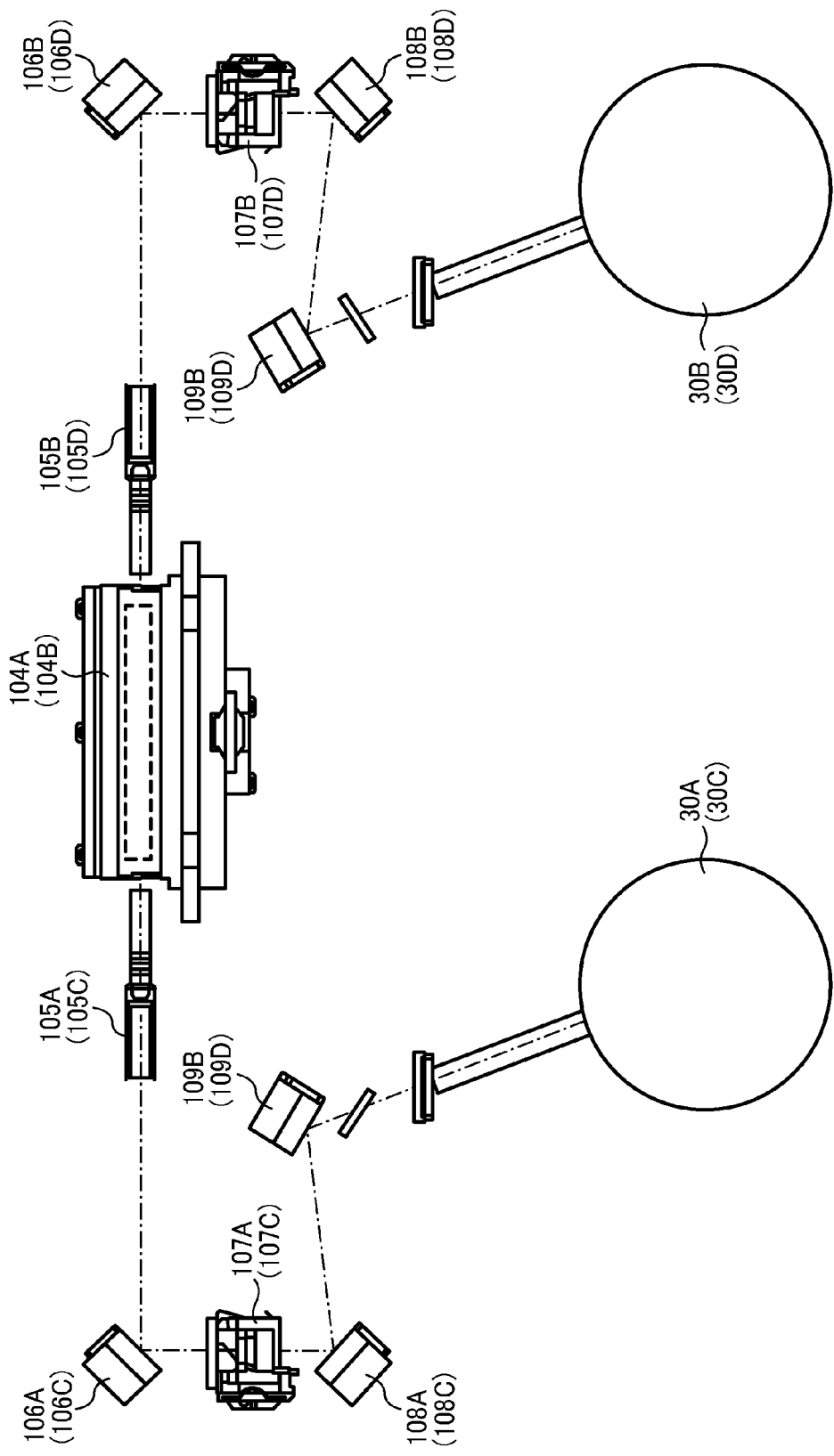

OPTICAL SCANNER AND IMAGE FORMING APPARATUS INCLUDING SAME

CROSS-REFERENCE TO RELATED APPLICATIONS

This patent application is based on and claims priority pursuant to 35 U.S.C. §119 from Japanese Patent Application Nos. 2011-261770, filed on Nov. 30, 2011, and 2012-136029, filed on Jun. 15, 2012, both in the Japan Patent Office, which are hereby incorporated herein by reference in their entirety.

BACKGROUND OF THE INVENTION

1. Field of the Invention

Exemplary aspects of the present disclosure generally relate to an image forming apparatus, such as a copier, a facsimile machine, a printer, or a multi-functional system including a combination thereof, and more particularly, to an optical scanner and an image forming apparatus including the optical scanner.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photosensitive drum); an optical scanner projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Generally, the optical scanner includes a light source unit that projects a modulated light beam based on an image signal. The projected light beam is deflected and scanned by a rotary polygon mirror and focused onto the image bearing member via a focusing lens and a folding mirror, thereby forming an electrostatic latent image on the surface of the image bearing member.

A part of the light beam deflected by the rotary polygon mirror is separated into a scan-start signal and a scan-end signal by the folding mirror and strikes a light detector. Accordingly, the light beam is converted to an electric trigger signal. For overall size reduction of the optical scanner or to illuminate a target with a light beam at a desired angle, there is known an optical scanner equipped with the folding mirror inside the optical scanner to reflect the light beam.

More specifically, in order to reflect the light beam deflected by a deflector using the rotary polygon mirror toward the target, the folding mirror is generally long in a main scanning direction of the deflector. One end of such a long folding mirror is supported at two points, and the other end is held at a single point, thereby keeping the folding mirror flat even when the folding mirror is mounted in the optical scanner, such as in JP-H10-20628-A.

These two supporting points at one end of the folding mirror are each disposed a certain distance from end portions of the folding mirror in a short-side direction. One supporting point at the other end of the folding mirror in the longitudinal direction is disposed substantially at the center of the folding mirror in the short-side direction.

A drawback to this approach is that the folding mirror held in the above described manner still vibrates rotationally due to vibrations generated by a drive source in the image forming apparatus. As a result, image defects such as banding appear in a resulting image.

In view of the above, in another approach, the reflective mirror such as the folding mirror is adhered to a mirror holder using an adhesive. In this configuration, according to JP-H06-337342-A, the mirror holder includes a panel with holes, one of which includes a projection that supports a reflecting surface of the mirror. The other side of the reflecting surface is pressed by an elastic member. The projection of the hole of the panel of the holder and a portion of the reflective mirror that presses the hole of the panel of the holder are adhered using the adhesive. Further, the thickness of the adhesive portion is thinner than the thickness of the mirror so that when the adhesive is cured and shrunk, angular displacement of the mirror is suppressed.

Still another approach for suppressing rotational vibration of the reflective mirror is one in which a portion of the panel of the holder pressed by the reflective mirror includes an elastic member such as rubber, and the reflective mirror is pressed against the elastic member from the opposite side of the elastic member, instead of using an adhesive.

In another approach, a side surface of the reflective mirror is adhered using an adhesive.

Although advantageous, use of adhesive involves adjustment of the amount of adhesive, securing sufficient curing time, prevention of contamination of the mirror by the adhesive, and so forth. Consequently, when using the adhesive, special attention needs to be paid, complicating the assembly of the mirror.

In view of the above, there is thus an unsolved need for the image forming apparatus that can suppress rotational vibration of the mirror without using an adhesive and thus maintain the orientation of the mirror even when other devices vibrate.

SUMMARY OF THE INVENTION

In view of the foregoing, in an aspect of this disclosure, there is provided an optical scanner including a light source, a deflector, a reflective member, a contact member, and a pressing member. The light source projects a light beam. The deflector deflects the light beam. The reflective member reflects the light beam deflected by the deflector toward a target and includes a reflective plane and a rear plane opposite the reflective plane. The contact member contacts one of the rear plane and a first lateral plane perpendicular to the reflective plane to position the reflective member in place. The pressing member presses the reflective member against the contact member and includes a first pressing portion and a second pressing portion. The first pressing portion presses the reflective plane of the reflective member. The second pressing portion presses a ridge of the reflective member at which the reflective plane and a second lateral plane opposite the first lateral plane and perpendicular to the reflective plane of the reflective member meet.

According to another aspect, an image forming apparatus includes an image bearing member, an optical scanner, a developing device, and a transfer device. The image bearing member bears an electrostatic latent image on a surface thereof. The optical scanner illuminates the surface of the image bearing member with a light beam to form the electrostatic latent image on the surface thereof. The optical scanner includes a light source, a deflector, a reflective member, a contact member, and a pressing member. The light source projects a light beam. The deflector deflects the light beam. The reflective member reflects the light beam deflected by the deflector toward a target and includes a reflective plane and a rear plane opposite the reflective plane. The contact member contacts one of the rear plane and a first lateral plane perpendicular to the reflective plane to position the reflective member in place. The pressing member presses the reflective member against the contact member and includes a first pressing portion and a second pressing portion. The first pressing portion presses the reflective plane of the reflective member. The second pressing portion presses a ridge of the reflective member at which the reflective plane and a second lateral plane opposite the first lateral plane and perpendicular to the reflective plane of the reflective member meet. The developing device develops the electrostatic latent image formed on the image bearing member using toner to form a toner image. The transfer device transfers the toner image from the image bearing member onto a recording medium.

The aforementioned and other aspects, features and advantages would be more fully apparent from the following detailed description of illustrative embodiments, the accompanying drawings and the associated claims.

BRIEF DESCRIPTION OF THE SEVERAL VIEWS OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 3 is a schematic diagram illustrating the optical scanner of FIG. 2 as viewed in a sub-scanning direction of the optical scanner;

DETAILED DESCRIPTION OF THE INVENTION

Figure 1:
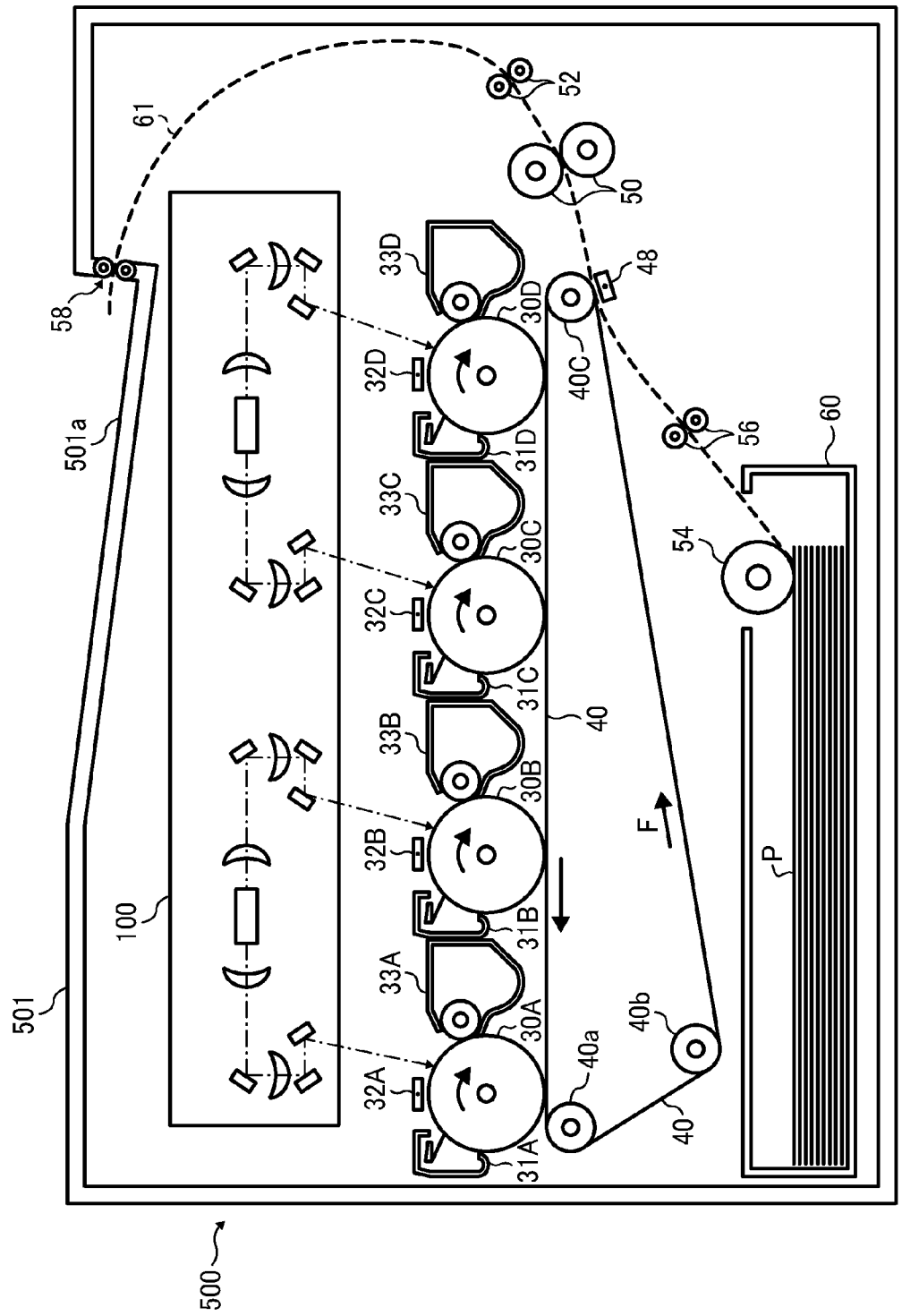
FIG. 1 is a schematic diagram illustrating an image forming apparatus employing an optical scanner according to an illustrative embodiment of the present invention.

A description is now given of illustrative embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, and initially with reference to FIG. 1, a description is provided of an image forming apparatus according to an aspect of this disclosure.

FIG. 1 is a schematic diagram illustrating the image forming apparatus according to an illustrative embodiment of the present invention.

As illustrated in FIG. 1, an image forming apparatus 500 includes a main body 501, an optical scanner 100, four photosensitive drums 30A, 30B, 30C, and 30D (which may be collectively referred to as photosensitive drums 30), one for each of the colors black, cyan, magenta, and yellow, an intermediate transfer belt 40, a sheet cassette 60, a sheet feed roller 54, a pair of registration rollers 56, a pair of sheet transport rollers 52, a fixing device 50, a pair of sheet discharge rollers 58, a controller, and so forth.

The main body 501 of the image forming apparatus 500 includes a sheet output tray 501a on the upper surface thereof. The sheet output tray 501a catches a recording medium being discharged after an image is printed thereon. The optical scanner 100 is disposed substantially below the sheet output tray 501a.

The optical scanner 100 illuminates the photosensitive drums 30A, 30B, 30C, and 30D with light beams each having a color component of black, cyan, magenta, and yellow, respectively, based on image information provided by an image reading device or an external device such as a personal computer (PC).

The photosensitive drums 30A, 30B, 30C, and 30D are disposed substantially below the optical scanner 100 and rotated in a clockwise direction in indicated by an arrow in FIG. 1 by a driving device.

Various imaging devices are disposed around each of the photosensitive drums 30A through 30D. For example, a charging device 32A for charging the surface of the photosensitive drum 30A with a predetermined voltage, a developing device 33A including a developing roller and a toner cartridge having toner of black, and a cleaning device 31A including a cleaning blade for cleaning the surface of the photosensitive drum 30A are disposed around the photosensitive drum 30A.

Similar to the photosensitive drum 30A, the same imaging devices are disposed around each of the photosensitive drums 30B, 30C, and 30D, except the color of toner stored in the toner cartridges of the developing devices 33B, 33C, and 33D. Charging devices 32B, 32C, and 32D, developing devices 33B including cyan toner, 33C including magenta toner, and 33D including yellow toner, and cleaning devices 31B, 31C, and 31D are disposed around the respective photosensitive drums 30B, 30C, and 30D.

The image forming apparatus 500 includes an intermediate transfer belt 40 which is entrained around a drive roller 40*b* and follower rollers 40*a* and 40*c*. An outer surface of the intermediate transfer belt 40 contacts the photosensitive drums 30A, 30B, 30C, and 30D. As the drive roller 40*b* rotates, the intermediate transfer belt 40 is rotated in the direction of arrow F in FIG. 1.

A transfer charger 48 serving as a transfer device is disposed opposite the follower roller 40*c* via the intermediate transfer belt 40 with a certain gap therebetween. The transfer charger 48 supplies the intermediate transfer belt 40 with a voltage having a polarity opposite that of the charging devices 32A, 32B, 32C, and 32D.

The sheet cassette 60 storing multiple recording media P is disposed substantially below the intermediate transfer belt 40. The sheet feed roller 54 disposed at an upper right side of the sheet cassette 60 picks up and sends the top sheet of the stack of recording media P in the sheet cassette 60, one sheet at a time. The recording medium P supplied from the sheet cassette 60 by the sheet feed roller 54 is delivered to the intermediate transfer belt 40 via the pair of registration rollers 56.

The fixing device 50 is disposed downstream from the intermediate transfer belt 40 in the direction of transport of the recording medium P. The fixing device 50 includes a pressing roller and a heating roller. With heat and pressure, a toner image transferred onto the recording medium P is fixed. After the toner image is fixed on the recording medium P, the recording medium P is delivered to the pair of sheet discharge rollers 58 by which the recording medium is output onto the sheet output tray 501*a*.

Figure 2:
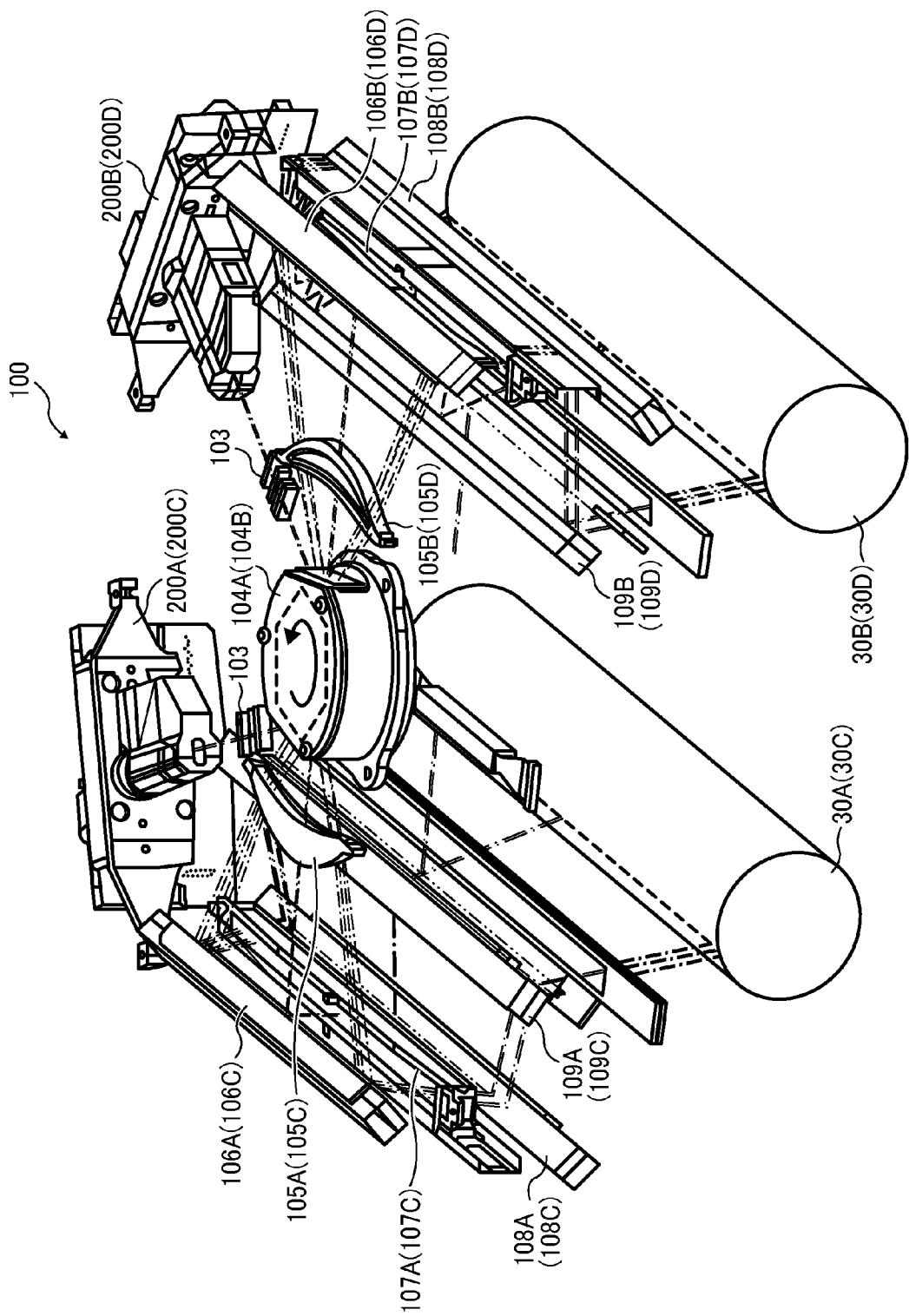
FIG. 2 is a perspective view schematically illustrating the optical scanner employed in the image forming apparatus of FIG. 1.

With reference to FIGS. 2 and 3, a description is provided of the optical scanner 100 according to the illustrative embodiment of the present invention. FIG. 2 is a perspective view schematically illustrating the optical scanner 100. FIG. 3 shows the optical scanner 100 as viewed in the sub-scanning direction. As illustrated in FIGS. 2 and 3, the optical scanner 100 includes polygon mirrors 104A and 104B (which may be collectively referred to as polygon mirrors 104) serving as a deflector; first scanning lenses 105A, 105B, 105C, and 105D disposed downstream from a light path; first reflective mirrors 106A, 106B, 106C and 106D (which may be collectively referred to as first reflective mirrors 106); second reflective mirrors 108A, 108B, 108C, and 108D (which may be collectively referred to as second reflective mirrors 108); second scanning lenses 107A, 107B, 107C, and 107D (which may be collectively referred to as second scanning lenses 107); and third reflective mirrors 109A, 109B, 109C, and 109D.

The second reflective mirrors 108A (108C) and 108B (108D) are disposed below the first reflective mirrors 106A (106C) and 106B (106D). The second scanning lens 107A (107C) is disposed between the first reflective mirror 106A (106C) and the second reflective mirror 108A (108C). The second scanning lens 107B (107D) is disposed between the first reflective mirror 106B (106D) and the second reflective mirror 108B (108D).

The optical scanner 100 includes light source units 200A, 200B, 200C, and 200D. The light source units 200A and 200B project light beams against the polygon mirror 104A so that the light beams scan the photosensitive drums 30A and 30B. The light source units 200C and 200D project light beams against the polygon mirror 104B so that the light beams scan the photosensitive drums 30C and 30D.

The light source units 200A through 200D project light beams against deflection surfaces of the polygon mirrors 104A and 104B such that the light beams strike the deflection surfaces at a certain angle. Cylindrical lenses 103 are arranged along light paths of the light beams projected from the light source units 200A through 200D. The cylindrical lenses 103 focus the incident light beams in the sub-scanning direction near the polygon mirrors 104A and 104B.

The polygon mirrors 104A and 104B include a plurality of deflection planes on lateral sides thereof by which the light beams are deflected. In other words, the polygon mirrors 104A and 104B are formed in the shape of the hexagonal prism having the deflection planes on the lateral sides. The light beams projected from the light source units 200A through 200D and focused near the deflection surfaces of the polygon mirrors 104A and 104B are deflected by the deflection planes of the polygon mirrors 104A and 104B to strike the surface of the photosensitive drums 30.

The first scanning lens 105A through 105D convert a constant angular velocity motion of the light deflected by the polygon mirrors 104A and 104B to a constant velocity motion relative to the main scanning direction of the photosensitive drums which corresponds to an axial direction of the photosensitive drums 30.

Subsequently, the first reflective mirrors 106A through 106D reflect the light beams passing through the first scanning lenses 105A through 105D towards the second scanning lenses 107A through 107D. The light beams striking the second scanning lenses 107A through 107D are focused onto the surfaces of the photosensitive drums 30A through 30D via the reflective mirrors 108A through 108D, and 109A through 109D.

Next, a description is provided of image forming operation of the image forming apparatus 500 equipped with the optical scanner 100 described above.

When the image forming apparatus 500 receives image information from an external device such as a personal computer (PC), the light beam projected from the light source unit 200 is focused near the deflection planes of the polygon mirror 104 by the cylindrical lens 103. The light beam deflected by the polygon mirror 104 strikes the first scanning lens 105. Subsequently, the light beam incident upon the first scanning lens 105 is reflected by the first reflective mirror 106 and then enters the second scanning lens 107. After passing through the second scanning lens 107, the light beam is focused onto the surface of the photosensitive drum 30 via the second reflective mirror 108 and the third reflective mirror 109.

The light beam from the light source unit 200 strikes an image region of the photosensitive drum 30 in a state in which the intensity of the light beam is adjusted to a predetermined intensity in advance.

A photosensitive layer of each of the photosensitive drums 30A through 30D is charged with a predetermined voltage by the charging devices 32A through 32D, thereby distributing a certain charge density thereon. While the photosensitive drums 30A through 30D rotate in the direction of arrow in FIG. 1, the surfaces thereof are scanned by light beams, thereby forming an electrostatic latent image on the surface of the photosensitive drums 30A through 30D.

After the electrostatic latent images are formed on the photosensitive drums 30A through 30D, toner of the respective color is supplied to the surface of the photosensitive drums 30A through 30D by the developing roller of the developing devices 33A through 33D. The supplied toner sticks to the electrostatic latent images on the photosensitive drums 30A through 30D, so that the electrostatic latent images are developed into visible images, also known as toner images. The visible images or the toner images on the photosensitive drums 30A through 30D are transferred onto the intermediate transfer belt 40 so that they are superimposed one atop the other, thereby forming a composite color toner image.

The composite color toner image is transferred onto a recording medium P supplied from the sheet cassette 60. Subsequently, the recording medium P bearing the composite color toner image is sent to the fixing device 50. In the fixing device 50, heat and pressure are applied to the composite color toner image on the recording medium, thereby fixing the composite color toner image on the recording medium P. After the fixing process, the recording medium P is discharged onto the sheet output tray 501a by the pair of sheet discharge rollers 58.

Figure 4A:
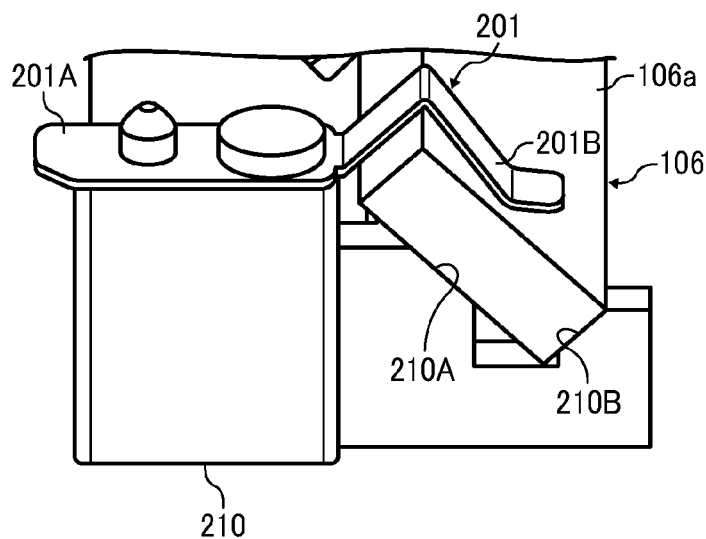
FIG. 4A is a partially enlarged perspective view schematically illustrating a related-art mirror support portion of the optical scanner.
Figure 4B:
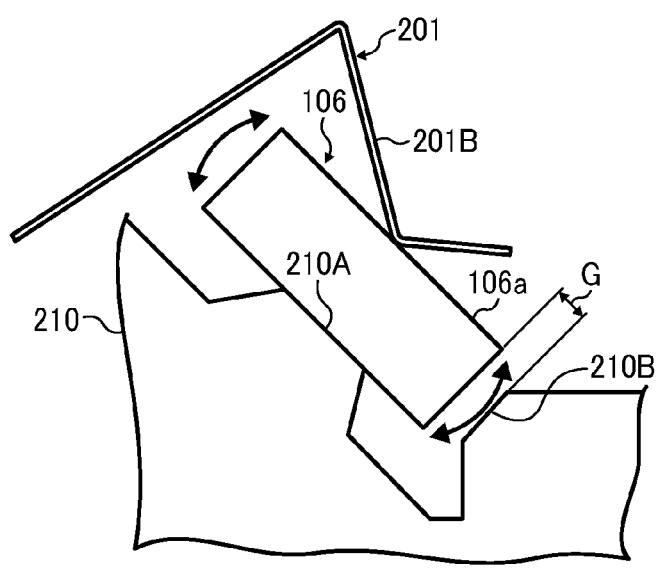
FIG. 4B is a cross-sectional view schematically illustrating the mirror support portion of FIG. 4A.

In order to facilitate an understanding of the related art and of the novel features of the present invention, a description is provided of a conventional reflective mirror support mechanism with reference to FIGS. 4A and 4B.

FIG. 4A is a partially enlarged perspective view schematically illustrating a related-art mirror support portion of an optical scanner. FIG. 4B is a cross-sectional view schematically illustrating the mirror support portion of FIG. 4A.

The related-art mirror support mechanism includes a housing 210 of the light source unit 200 and a pressing member 201 that presses a reflective plane 106a of the reflective mirror 106 against the housing 210. The housing 210 includes a first contact surface 210A that contacts a rear surface of the reflective mirror 106 and a second contact surface 210B that contacts and bears a lateral surface of the reflective mirror 106 perpendicular to the reflective plane 106a.

More specifically, the pressing member 201 is a cantilever member with one end thereof including a base end 201A fixed to the housing 210 and the other end thereof including a free end 201B that presses the reflective plane 106a of the reflective mirror 106.

In this configuration, the pressing member 201 presses only the reflective plane 106a of the reflective mirror 106, and when vibrations are generated an end portion of the reflective mirror 106 separates from the contact surface of the housing 210, thereby forming a gap therebetween.

As a result, the reflective mirror 106 vibrates rotationally in the direction of arrows as illustrated in FIG. 4B, causing the orientation and the position of the reflective plane 106a of the reflective mirror 106 to change undesirably. When this occurs, the focusing position of the light beam from the reflective plane 106a changes, thus resulting in color drift or misalignment of colors. When the reflective mirror 106 is supported only at a single point, this phenomenon occurs more easily.

Figure 5A:
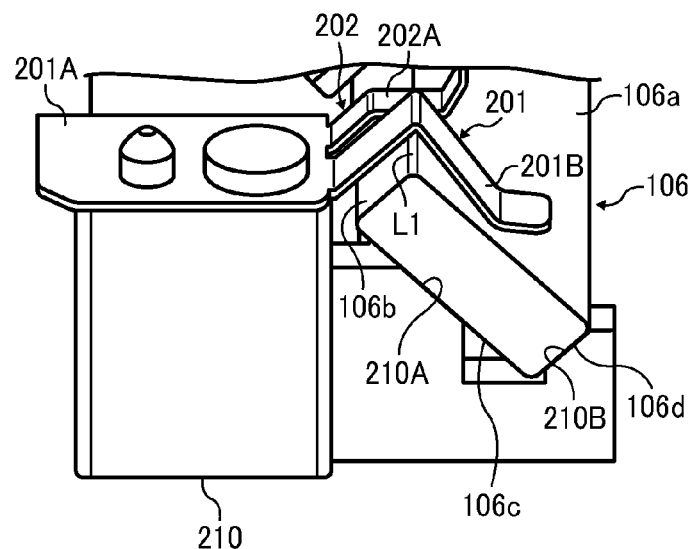
FIG. 5A is a partially enlarged perspective view schematically illustrating a mirror support portion of the optical scanner according to an illustrative embodiment of the present invention.
Figure 5B:
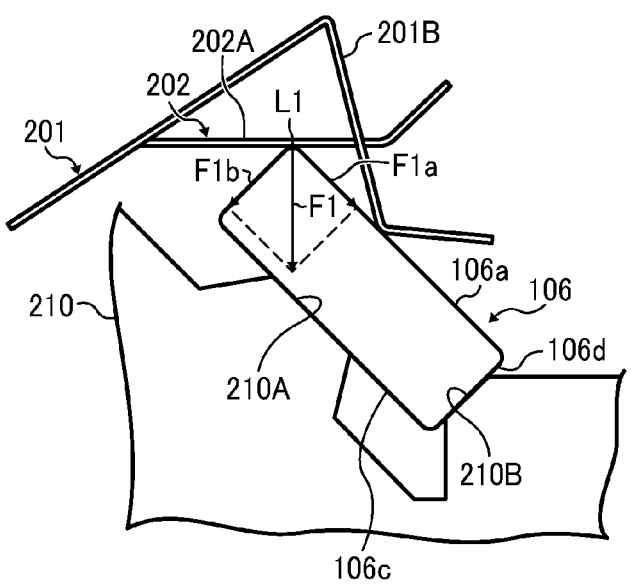
FIG. 5B is a cross-sectional view schematically illustrating the mirror support portion of FIG. 5A.

By contrast, as illustrated in FIGS. 5A and 5B, in addition to the free end (hereinafter, first pressing portion) 201B of the pressing member (hereinafter, first pressing member) 201 that presses the reflective plane 106a of the reflective mirror 106, the mirror support mechanism according to the present illustrative embodiment of the present invention includes a second pressing member 202 that presses a ridge line L1 of the reflective mirror 106.

More specifically, the first pressing portion 201B of the first pressing member 201 presses the reflective plane 106a of the reflective mirror 106, and a second pressing portion 202A of the second pressing member 202 presses the ridge line L1 which is a line at which the reflecting plane 106a of the reflective mirror 106 and a lateral plane 106b perpendicular to the reflective plane 106a opposite a lateral plane 106d mounted on the second contact surface 210B meet.

The first pressing member 201 and the second pressing member 202 constitute a mirror pressing member. As illustrated in FIGS. 5A and 5B, the first pressing member 201 and the second pressing member 202 are a single integrated member formed of a single metal planar member with one end thereof split into the first pressing member 201 and the second pressing member 202 and bent. The other end of the mirror pressing member, that is, opposite the first pressing member 201 and the second pressing member 202, comprises the base end 201A fixed to and cantilevered to the housing 210 of the light source unit 200.

With this configuration, the number of constituent parts can be reduced while suppressing rotational vibration of the reflective mirror 106.

The first pressing member 201 and the second pressing member 202 employ a flexible, elastic member such as a leaf spring that can restore its original shape even after deformation.

As described above, according to the present illustrative embodiment, the mirror pressing member including the first pressing member 201 with the first pressing portion 201B and the second pressing member 202 with the second pressing portion 202B is a cantilever member made of a metal planar member with one end thereof cantilevered to the housing 210 and the other end split into the first pressing portion 201B and the second pressing portion 202B.

With this configuration, when the cantilever member is bent, the shape-restoring force of the cantilever member can be used as a pressing force against the reflective plane 106a and the ridge line L1. The pressing force may be changed by adjusting the length of the cantilever member. With this configuration, a desired pressing force can be obtained while preventing an increase in the weight of the pressing member as compared with changing a section stiffness by changing a thickness.

As described above, the leaf spring can maintain the orientation of the reflective plane 106a of the reflective mirror 106 at a desired angle and position. Furthermore, the leaf spring exerts a force such that the surface of the reflective mirror 106 perpendicular to the reflective plane 106a is reliably pressed against a mirror bearing surface (here, the second contact surface 210B) of the housing 210, thereby preventing rotational vibration of the reflective mirror 106.

The second pressing member 202 exerts a force F1, as illustrated in FIG. 5B. As illustrated in FIG. 5B, the force F1 includes a force F1a and a force F1b. The force F1a acts as a force that presses the surface perpendicular to the reflective plane 106a of the reflective mirror 106 against the mirror bearing surface (210B) of the housing 210. The force F1b acts as a force that presses the reflective plane 106a of the reflective mirror 106 against the mirror bearing surface (210A) of the housing 210. In other words, a rear plane 106c of the reflective mirror 106 contacts the mirror bearing surface 210A.

It is to be noted that the ridge line L1 of the reflective mirror 106 as shown in FIG. 5A is chamfered with a size in a range of from C0.2 to C0.7 so that chipping of the corner or the edge of the glass is prevented.

With this configuration, rotational vibration of the reflective mirror can be prevented reliably.

Figure 6:
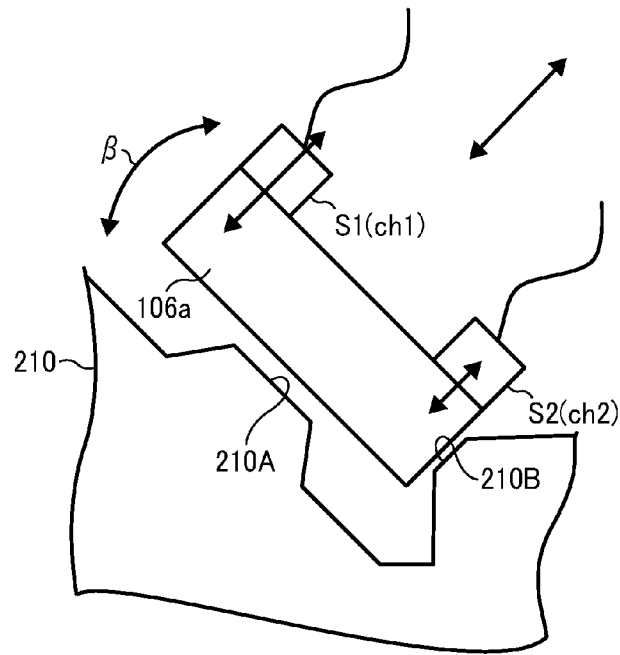
FIG. 6 is a cross-sectional view schematically illustrating a configuration of an experiment of vibration of a reflective mirror employed in the optical scanner.
Figure 7:
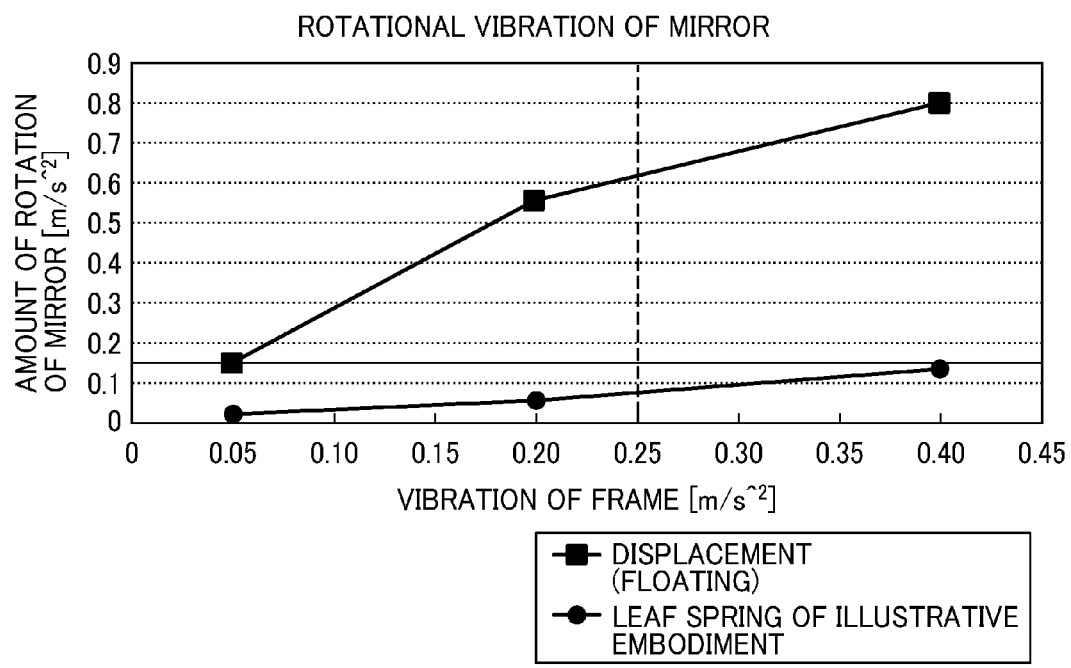
FIG. 7 is a graph showing a relation of vibration of the mirror and a housing of the optical scanner shown in FIGS. 5A and 5B.

With reference FIGS. 6 and 7, a description is provided of an experiment of rotational vibration of the reflective mirror. FIG. 6 is a cross-sectional view schematically illustrating a configuration of the experiment. FIG. 7 is a graph showing the result of the experiment.

As illustrated in FIG. 6, accelerometers S1 (ch1) and S2 (ch2) are disposed at each end of the reflective mirror 106 in the main scanning direction to obtain a difference between accelerations detected by the accelerometers S1 and S2. The obtained acceleration difference is used as a characteristic value of an amount of rotation. If there is no rotational motion, the characteristic value is "0" (zero).

The amount of rotation is obtained by the following equation:

Amount of rotation (acceleration difference)=$f$ ($a$_ch1−$a$_ch2).

In FIG. 7, a horizontal axis represents vibration of a frame on which the optical scanner is mounted, and a vertical axis represents an amount of rotation (acceleration difference) of the mirror.

In the related-art mirror support mechanism as illustrated in FIGS. 4A and 4B, rotation movement of the mirror increased as the vibration of the frame increased. However, in the mirror support mechanism using the leaf spring including the first pressing member 201 and the second pressing member 202 as illustrated in FIGS. 5A and 5B, even when the vibration of the frame increases, the rotation movement of the mirror can be reduced by approximately 80%.

It is to be noted that an allowable amount of rotation movement of the mirror is approximately 0.15 m/s^2 based on a correlation with an image. Depending on a frequency of vibration, the allowable amount of rotational movement changes. It is assumed that an image defect is generated due to rotational movement of the mirror at a frequency of approximately 350 Hz.

A variation of the mirror support mechanism of the present illustrative embodiment includes providing a sheet member (i.e. film) having a thickness of some tens of micrometers between the rear surface of the reflective plane of the mirror and the contact surface (mirror bearing surface) of the housing, and between the lateral surface perpendicular to the reflective plane of the mirror and the contact surface (bearing surface) of the housing. This configuration also prevents vibration of the mirror. In this configuration, the sheet member is adhered to a plurality of places (in this example, three places) of the mirror bearing surface of the housing, thereby suppressing vibrations including primary resonance of the mirror.

As described above, according to the illustrative embodiment of the present invention, not only the reflective plane of the mirror, but also the ridge at which the reflective plane and the surface perpendicular to the reflective plane meet is pressed, thereby exerting a pressing force in the direction opposite of displacement of the mirror. With this configuration, the mirror contacts reliably the mirror bearing surface of the housing, thereby preventing vibration of the mirror without using an adhesive.

According to an aspect of this disclosure, the present invention is employed in the image forming apparatus. The image forming apparatus includes, but is not limited to, an electrophotographic image forming apparatus, a copier, a printer, a facsimile machine, and a multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising:
   a light source to project a light beam;
   a deflector to deflect the light beam;
   a reflective member to reflect the light beam deflected by the deflector toward a target, the reflective member including a reflective plane and a rear plane opposite the reflective plane;
   a contact member to contact one of the rear plane of the reflective member and a first lateral plane perpendicular to the reflective plane to position the reflective member in place; and
   a pressing member to press the reflective member against the contact member, the pressing member including
       a first pressing portion to press the reflective plane of the reflective member; and
       a second pressing portion to press a ridge of the reflective member at which the reflective plane and a second lateral plane opposite the first lateral plane and perpendicular to the reflective plane of the reflective member meet.

2. The optical scanner, according to claim 1, wherein the first pressing portion and the second pressing portion of the pressing member are formed of a single metal planar member with one end thereof split into the first pressing portion and the second pressing portion and bent.

3. The optical scanner, according to claim 1, wherein the first and the second pressing portions are elastic members.

4. The optical scanner, according to claim 2, wherein the pressing member comprises a cantilever member with one end thereof being cantilevered and the other end thereof including the first and the second pressing portions.

5. The image forming apparatus, comprising:
   an image bearing member to bear an electrostatic latent image on a surface thereof;
   the optical scanner of claim 1 to illuminate the surface of the image bearing member with a light beam to form the electrostatic latent image on the surface thereof;

a developing device to develop the electrostatic latent image formed on the image bearing member using toner to form a toner image; and a transfer device to transfer the toner image onto a recording medium.

\* \* \* \* \*